United States Patent [19]

Southard

[11] Patent Number: 4,733,534
[45] Date of Patent: Mar. 29, 1988

[54] INTERNAL COMBUSTION ENGINE AND OUTPUT MOTION TRANSDUCER

[76] Inventor: Albert A. Southard, R.R. #3, Council Grove, Kans. 66846

[21] Appl. No.: 912,573

[22] Filed: Sep. 29, 1986

[51] Int. Cl.$^4$ ............................................. F02B 71/04
[52] U.S. Cl. ..................................................... 60/595
[58] Field of Search ......................................... 60/595

[56] References Cited

U.S. PATENT DOCUMENTS

| | | | |
|---|---|---|---|
| 3,119,230 | 1/1964 | Kosoff | 60/595 |
| 3,525,215 | 8/1970 | Conrad | 60/595 |
| 3,627,449 | 12/1971 | Salo | 60/595 |
| 4,428,198 | 1/1984 | Sutter | 60/595 |

*Primary Examiner*—Allen M. Ostrager
*Attorney, Agent, or Firm*—Robert E. Breidenthal

[57] ABSTRACT

A motion transducer wherein a variable volume chamber of a trochoidal rotary mechanism is operatively connected by a liquid working fluid to a variable volume chamber of a reciprocating piston mechanism, whereby a rotary motion can be converted to a reciprocating motion and vice versa. An internal combustion engine directly productive of aone of such kinds of motions is drivingly connected to the transducer to obtain the other kind of motion as output. The piston of a reciprocating internal engine can be movable in unison with the piston of the reciprocating system, or alternatively, the rotary shaft of a Wankel-type internal combustion engine can be directly coupled to the rotary shaft of the trochoidal rotary mechanism.

18 Claims, 12 Drawing Figures

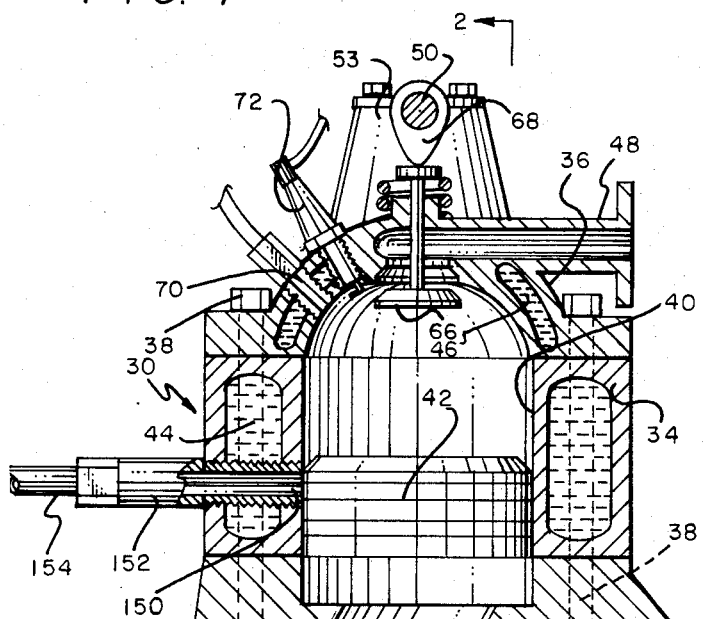
FIG. 1
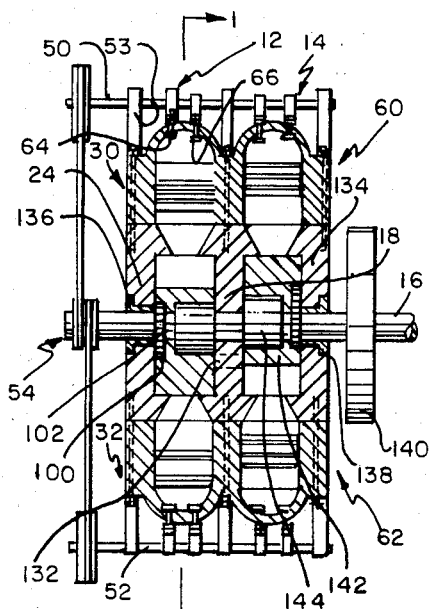
FIG. 2
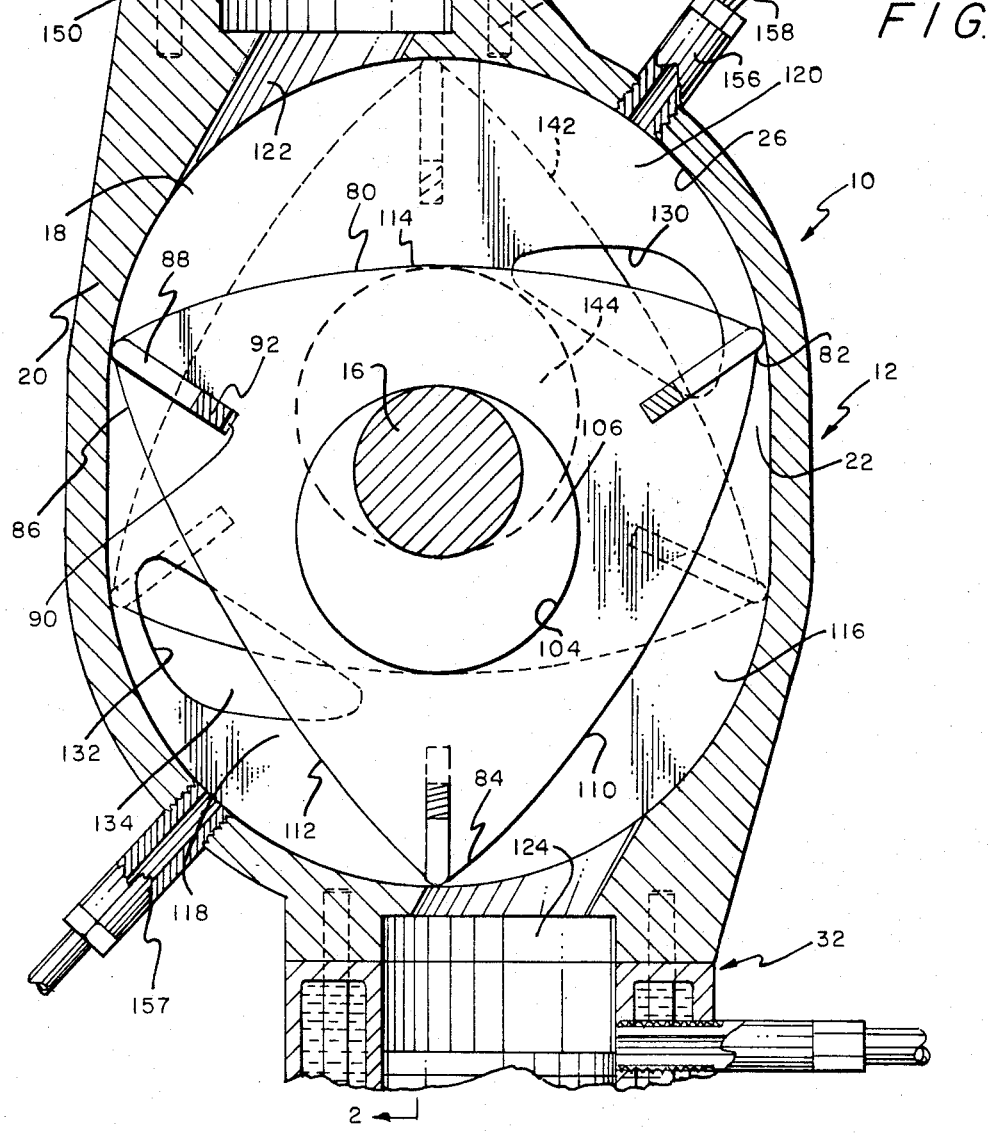

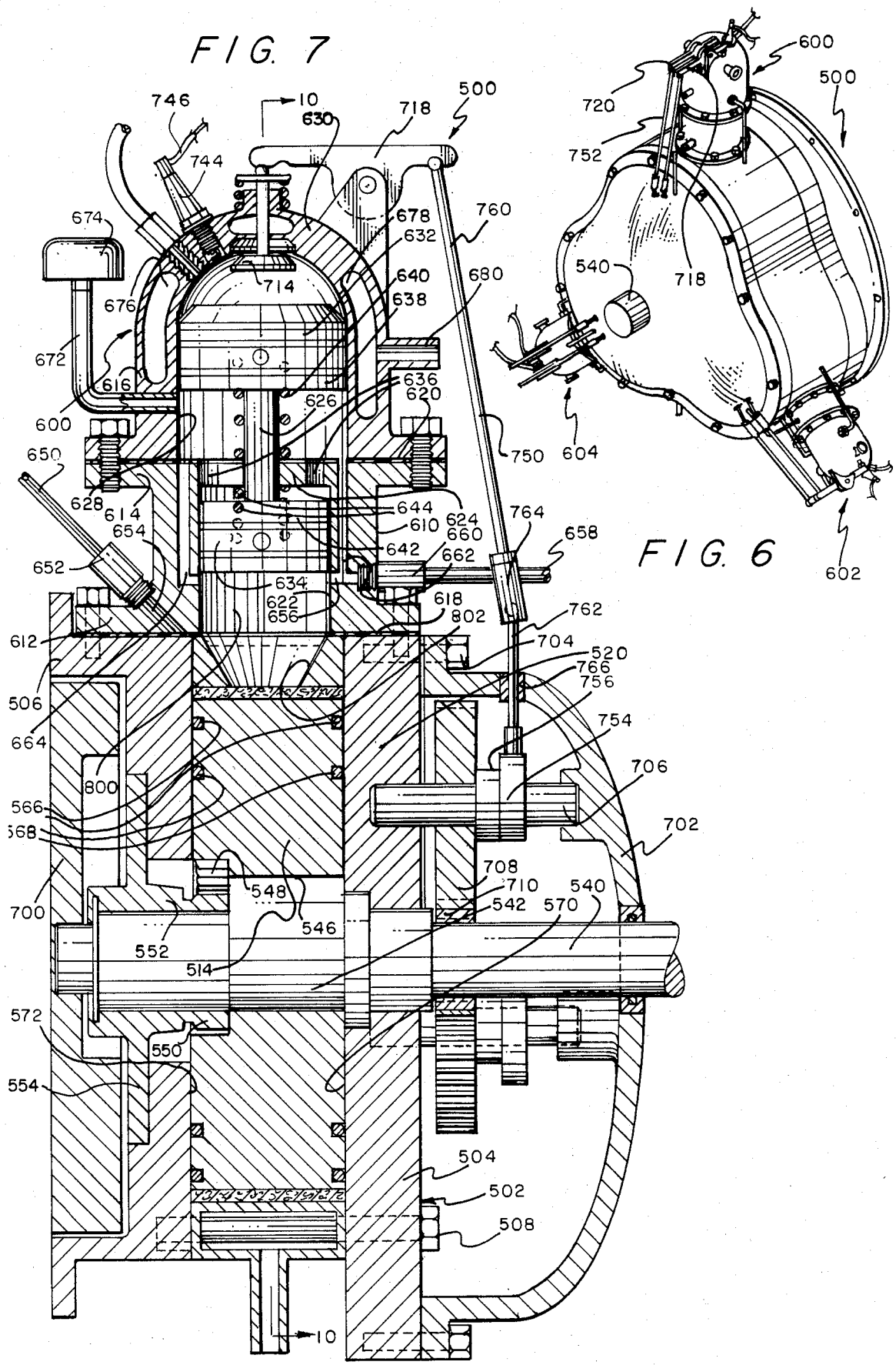

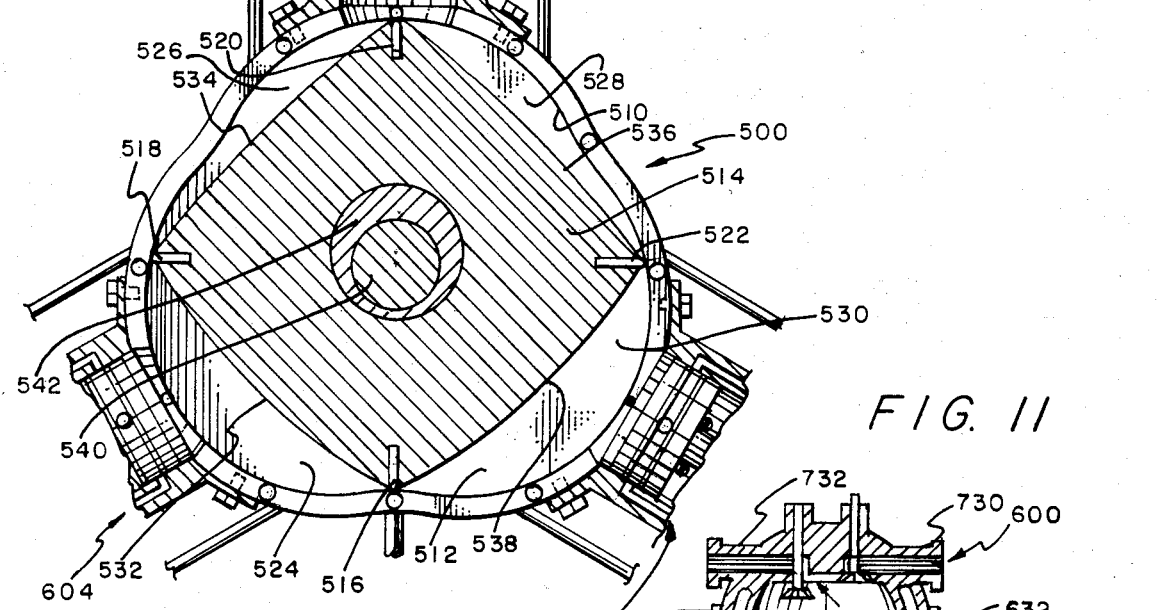
FIG. 10
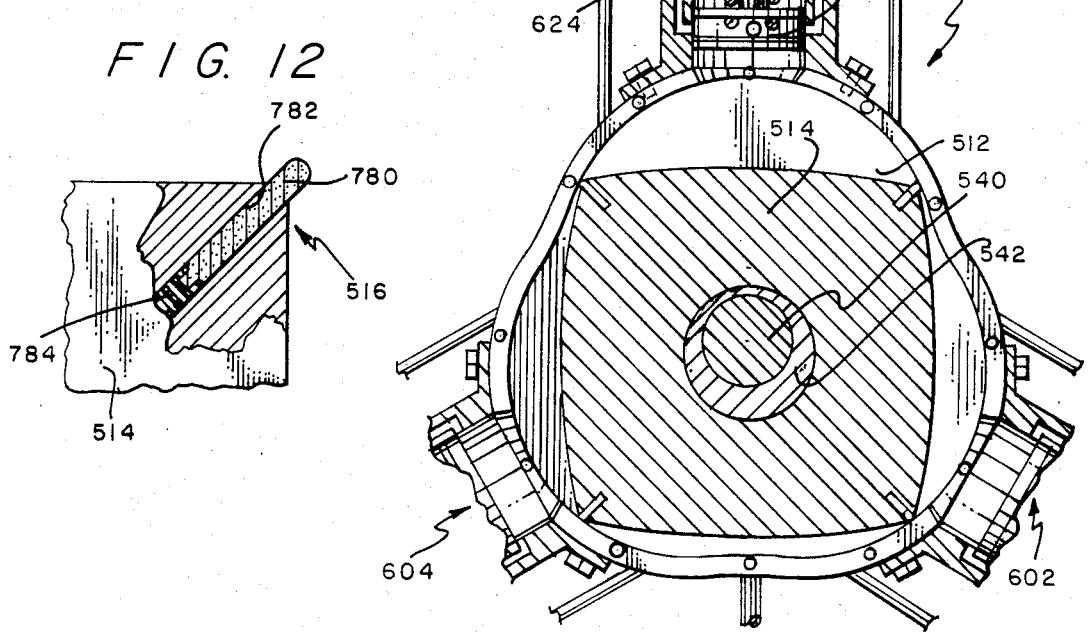
FIG. 11
FIG. 12

INTERNAL COMBUSTION ENGINE AND OUTPUT MOTION TRANSDUCER

BACKGROUND OF THE INVENTION

1. Field of the Invention

The present invention relates generally to motion transducers and more particularly pertains to a method of and apparatus for converting a linear reciprocating motion to a rotary motion and vice versa. Even more particularly, the invention involves such conversion using a liquid as a working fluid, and also involves the optional provision of an internal combustion engine productive of one of such motions as outputs applied to the transducer to obtain the other form of motion as output.

In its broadest sense, the present invention involves hydraulically coupling first and second variable volume units, wherein the coupled volume of the first unit varies in relation to a rotary motion and wherein the coupled volume of the second unit varies in relation to a linear reciprocating motion. More specifically, the rotary motion of the first unit is that a rotary shaft operatively connected by an eccentric and a rotor to vary the coupled volume of a trochoidal chamber, with the reciprocating motion of the second unit being that of a piston in a cylindrical chamber. The arrangement is such that reciprocating motion of the piston can be brought about by forcing rotation of the rotary shaft; or conversely, forced reciprocation of the piston will cause rotation of the rotary shaft. The illustrated embodiments of the invention each show an input of reciprocating motion with a resultant rotary motion output, and in each case show the use of a two-stroke or four-stroke internal combustion engine to effect the input reciprocating motion of a piston.

Rotary internal combustion engines, particularly those involving a rotor operating in a trochoidal chamber as in the Wankel engine have become widely known in the last decade or so. Indeed, such an engine can have its rotary output applied to drive the rotary shaft of the trochoidal-type fluid unit to ultimately obtain a reciprocating motion as output.

2. Description of Related Art

The present invention is related in part to conventional two- and four-stroke cycle internal combustion engines incorporating a rectilinearly reciprocating piston, and is also related in part to conventional 2:3 and 3:4 Wankel-type internal combustion engines that incorporate a rotor mounted on an eccentric.

SUMMARY OF THE INVENTION

In a broad sense, the invention has to do with hydraulically mating structural features of two distinct types of internal combustion engines so that the operation of one as the prime mover effectively actuates the other in a reverse sense to function as a motion transducer. The two distinctive types of internal combustion engines are the rotary type exemplified by Wankel engines and the reciprocating piston type.

The hydraulic mating or coupling utilizing rotary engine structure is disclosed as being driven by at least one reciprocating piston type internal combustion engines so that the reciprocating motion of the piston drives the shaft of the rotary engine to rotate in one direction. The hydraulic coupling may be viewed as performing a somewhat similar function to that of the piston rods and crankshaft in changing a reciprocating motion to a rotary motion.

While the reciprocating piston engines are disclosed as the prime movers, those skilled in the art will appreciate that a rotary engine can be employed to drive rotation of the hydraulic motion transducer whereby reciprocation of a piston is effected. This aspect of the invention is not emphasized or depicted in detail as a rotary motion output is believed to be generally of much greater use.

In accordance with the objective of transforming the reciprocating motion of the piston of an internal combustion engine, a broad aspect of the invention involves in a method of converting a rotary motion to a linear reciprocating motion and vice versa, the steps comprising maintaining fluid communicating between first and second variable volume chambers during a predetermination portion of a rotary motion cycle, and varying the volume of the first chamber as a function of the position of a linearly movable piston in a cylinder partially bounding such chamber, and varying the volume of the second chamber as a function of the position of a rotor movable in a cavity defined by a trochoidal wall partially bounding the chamber, with the rotor being coupled to a rotary shaft.

BRIEF DESCRIPTION OF THE DRAWING

The invention will be fully understood in the light of the following description of preferred embodiments of the invention, such description being given in conjunction with the accompanying drawings illustrative of the same, wherein;

FIG. 1 is a fragmentary sectional view through one bank of a two bank power assembly transverse to the rotary shaft of a 2:3 trochoidal fluid unit that is hydraulically coupled to an opposed pair of similar four-stroke internal combustion engines (one of which is only partially shown) that have the axis of the shaft as a line of symmetry with respect to each other, the view being taken upon the plane of the section line 1—1 in FIG. 2, with hidden structural details being shown in dashed outline;

FIG. 2 is a reduced longitudinal sectional view of the power assembly shown in FIG. 1, the view being taken on the plane of the section line 2—2 in FIG. 1;

FIG. 6 shows still another modified power assembly utilizing a 3:4 trochoidal fluid unit and is an isometric view taken from the trochoidal unit output shaft end thereof, and shows the same severed from its fuel, ignition and coolant sources;

FIG. 7 is an enlarged fragmentary longitudinal sectional view of the upper portion of the power assembly taken upon the plane of the section line 7—7 in FIG. 8, with spark plug, the fuel injector as well as the rotary shaft and its associated eccentric being shown in elevation;

FIG. 10 is a reduced fragmentary sectional view taken upon the plane of the section line 10—10 in FIG. 7, with the cylinder of the upper engine and its contents being shown in elevation;

FIG. 11 is a view of the general character of FIG. 10 and shows changed positions of the rotor and the piston, with FIGS. 10 and 11 respectively showing the (uppermost engine) piston at its uppermost and lowermost position and the rotor orientations corresponding thereto; and, FIG. 12 is an enlarged fragmentary detail view to show the provisions made to effect a seal between a rotor tip or cusp and the wall of the trochoidal cavity, the view showing the sealing element as extended by compression spring means.

DESCRIPTION OF PREFERRED EMBODIMENTS OF THE INVENTION

Figure 3:
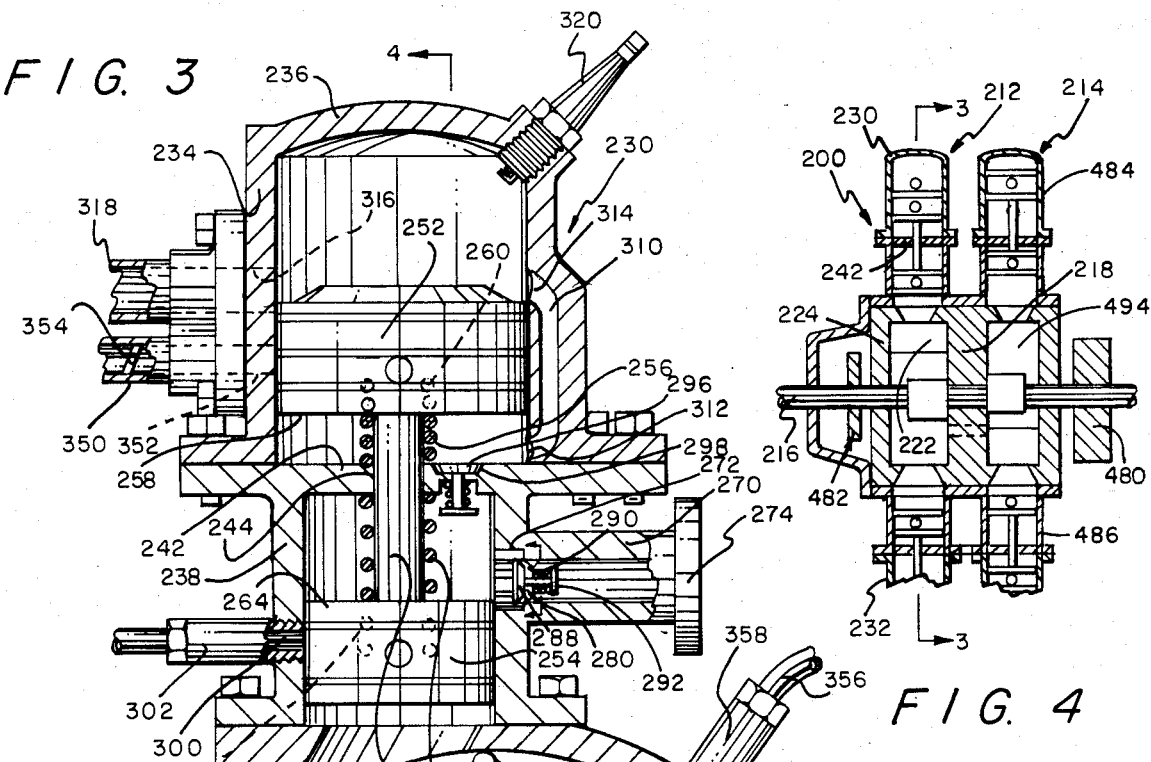
FIG. 3 shows a modified power assembly and is a fragmentary sectional view through one bank of a two bank power assembly transverse to the rotary shaft of a 2:3 trochoidal fluid unit that is hydraulically coupled to an opposed pair of similar pistons operated as a two cycle internal combustion engine (one of which is only partially shown) that have the axis of the shaft as a line of symmetry with respect to each other, the view being taken upon the plane of the section line 3—3 in FIG. 4, with hidden details being shown in dashed outline.

Referring now to the drawings, wherein like numerals refer to like parts throughout the various views, and giving initial attention to the form of the invention shown in FIGS. 1 and 2, the numeral 10 designates generally a two bank power assembly comprised of a first power assembly bank 12 and a second power assembly bank 14.

The banks 12 and 14 are identical except for being arranged 180° out of phase with respect to each other about their common axis defined by an integral rotary shaft 16 common to the banks 12 and 14. The banks 12 and 14 are separated axially by a wall 18.

Inasmuch as the banks 12 and 14 are identical, except as specifically pointed out, a detailed description of the bank 12 will suffice for both. The bank 12 comprises a housing 20 having a two-lobed trochoidal cavity 22 therein bounded axially by an outer wall 24 and the separating wall 18. The circumferential periphery of the cavity 22 is defined by a trochoidal wall 26 that is preferably of cylindrical shape, geometrically speaking.

Four-stroke internal combustion engines 30 and 32 are fixed at diametrically opposed positions to the housing 20, such engines 30 and 32 serving to power the first power assembly bank 12.

A full cycle of engine operation consists of an intake stroke, a compression stroke, a power stroke, and an exhaust stroke. A full cycle can be considered to be 360° with the strokes being spaced 90° apart. The engine 30 will be described as leading the engine 32 by 90°, however, the engine 30 can equally as well lag engine 32 by 90°.

The engines 30 and 32 are identical to each other and in their connections to the housing 20 in the sense of having the axis of the shaft 16 as a line of symmetry. Accordingly, a detailed description of the engine 30 will suffice for both of the engines.

Engine 30 includes a cylinder inclusive of a wall 34 seated against the housing 20, with the cylinder 34 being surmounted by a flanged and dome-like cylinder head 36, with the threaded bolts 38 passing through the flanges of the head 36, and through the cylinder 34 to secure the cylinder 34 and the head 36 to the housing 20 as clearly shown in FIG. 1. Though not shown, it will be manifest that suitable sealing gaskets can be interposed between the surfaces of the cylinder 34 that mate with the housing 20 and the flanges of the domed head 36.

The cylinder wall 34 defines a chamber 40 therein that is of circular cylindrical configuration, and within which a piston is sealingly reciprocable.

The wall 34 and the head 36 are provided coolant cavities 44 and 46 respectively that communicate with each other by conventional passageways, not shown, with ports, also not shown, being provided or in a conventional manner for forcing liquid coolant circulation therethrough, whereby the cylinder wall 34 and the head 36 are held to suitably cool operating temperature.

Cam shafts 50 and 52 are mounted for rotation at the head ends of the engines 30 and 32 by suitable pillow bearings 53 as shown in FIG. 2, with such cam shafts 50 and 52 being driven by toothed belts and pulleys generally designated by the reference numeral 54 from the rotary shaft 16. It will be noted that the second bank 14 includes engines 60 and 62 (corresponding to engines 30 and 32) which share the cam shafts 50 and 52 with the engines 30 and 32.

The engine head 34 is provided with intake and exhaust ports controlled by spring loaded valves 64 and 66, as shown. The valves 64 and 66 are actuated for conventional four-stroke engine operation by cams fixed to the shafts 50 and 52 such as the cam 68 shown in FIG. 1 in operative relationship to the valve 66. The port associated with the exhaust valve 66 has external communication by way of an exhaust conduit 48. A similar conduit, not shown, is associated with the valve 64 for the intake of air.

The head 36 is also provided with a fuel injection nozzle 70 and with a spark plug 72. Conventional means, not shown, are operatively connected to the shaft 16 to operate the nozzle 70 and the spark plug 72 in conventional synchronism with the valves 64 and 66 for customary four-stroke cycle internal engine operation.

Rather than the pistons 42 of the engines being coupled by connecting rods to a crankshaft to achieve a rotary output in the conventional manner, the pistons 42 are hydraulically coupled to drive the rotary shaft 16 by means bearing a striking similarity to a 2:3 Wankel-type rotary engine. The means in the instant case comprises a rotor 80 having three cusps 82, 84 and 86 that sealingly engage the trochoidal wall 26. The apex of each cusp is provided with a wiper blade such as the blade 88 provided in association with cusp 86. The blade 88 is received in a recess 90 and is yieldingly urged radially outward by a compression spring 92 in the recess to sliding and sealing engagement with the trochoidal wall 26. The axial extremities of the rotor 80 and the blades 88 slidingly and sealingly engage the separating wall 18 and the outer wall 24.

The rotor 80 has a recess at its end abutting the wall 24 that is peripherally bounded by teeth definitive of an internal ring gear 100 that is meshed with a smaller external gear 102 (having fewer teeth) fixed to the shaft 16 in an arrangement such that three rotations of the rotary shaft 16 occur for each rotation of the rotor 80.

The rotor 80 has a central opening 104 therein that rotatably receives therein an eccentric 106 that is rotatable on the shaft 16.

These familiar with Wankel-type rotary engines will readily appreciate that the meshing gears 100 and 102 together with the eccentric 106 coact to not only establish a fixed ratio of rotor 80 movement to shaft 16 rotation and to simultaneously keep all the cusps 82, 84 and 86 in constant sealing engagement with the trochoidal wall 26.

The sides 110, 112 and 114 of the rotor 80 jointly with the trochoidal wall 26 define respectively three chambers 116, 118 and 120 that orbit the axis of the shaft 16 during rotation of the latter. It will be noted that the cusps 82, 84 and 86 respectively separate chambers 116 and 120, chambers 116 and 118, and chambers 118 and 120. It will also be noted that the volume of each of the chambers 116, 118 and 120 increases and decreases thrice during each rotation of the rotor 80 which corresponds to three rotations of the shaft 16. In the position shown of the rotor 80 in FIG. 1, the chamber 120 is at its maximum volume, while chambers 116 and 118 are of equal volumes that are between their maximum and minimum volumes.

The housing 20 is provided with passageways 122 and 124 that respectively afford communication between the trochoidal cavity 22 and the interiors of the cylindrical walls 34 of the engines 30 and 32.

For reasons to be set forth later, it will be noted that while the axes of the cylindrical walls 34 of the engines 30 and 32 lie in a common plane normal to the rotary shaft 16, such axes depart from intersecting with the axis of the shaft 16, and depart angularly from such alignment a small amount so as to be modestly tangentially oriented as clearly shown in FIG. 1. The tangential arrangement is preferably more marked in the case of the passageways 122 and 124 than that of their respective engines for reasons to be given later.

The chambers 116, 118 and 120, as well as the passageways 122 and 124, and the volumes of the cylindrical engine chambers 40 radially inward of the pistons 42 are completely filled with liquid. A wide latitude of choice of liquid exists. Selection can vary with operating conditions. For example, while water is suitable in many instances, such choice is manifestly inappropriate when temperatures lower than 0° C. can occur when lengthy shut down intervals are anticipated, unless an antifreeze is employed. Other parameters should be considered such as viscosity, speed of operation, loads, toxicity, flammability, flash point, availability, etc. A good general purpose choice can be made from the family of commercial hydraulic fluids.

Such liquid should additionally fill the bank 14 as well as the volumes of passageways 130 and 132 that extend through the separating wall 18 between the trochoidal cavities 22 of the banks 12 and 14.

The housings 20 of the banks 12 and 14 are preferably composite with the trochoidal walls 26 being suitably fixed to the intervening or separating wall 18 and with the remote ends of the trochoidal walls 26 being fixed to end walls 24 and 134.

Fluid tight bearings 136 and 138 are provided in the walls 24 and 134 for rotation of the shaft 16 therethrough. The end of shaft 16 opposite the pulley and belt means 54 is connected to a load, not shown. Intermediate such load and the bank 14, the shaft 16 has a flywheel 140 mounted thereon to provide any desired degree of inertia or storage of angular momentum.

The rotor and eccentric of bank 14 are designated at 142 and 144.

It will be seen that in FIG. 2 that gear means interconnect the rotor 142 and the shaft 16, the same being a mirror image of such means 100 and 102 interconnecting the rotor 80 and the shaft 16.

Operation of the engine 32 is identical to that of engine 30 and a description of the latter will suffice for both.

Broadly speaking, the operation of engine 30 is quite similar to an ordinary four-stroke cycle engine, as will be most readily appreciated on recognizing that the liquid communicating with the underside of the piston 42 coacts with such piston so that forces therebetween are essentially the equivalent to those that are exerted between a piston and a conventional crankshaft-connecting rod combination.

As a starting point, assume that the piston 42 is at or closely approaching the upper limit of its travel path, with a fuel-air mixture charge compressed thereabove with the valves 64 and 66 being closed. Conventional means, not shown, driven by the shaft 16 now fires the spark plug 72 initiating combustion and resulting pressure driving the piston 42 downwardly. Downward movement of the piston 42 quickly closes the port 150 of an excess liquid release system that includes a check valve 152 and a pipe or tube 154.

The tube 154 is arranged to discharge into a reservoir, not shown. As will be described in greater detail presently, continued downward movement of the piston 42 forces liquid into the cavity 22 so as to act upon the rotor 80 and urge clockwise rotation of such rotor 80.

As the piston 42 nears the lower limit of its travel, the exhaust valve 66 is opened by the operative relationship of the shaft 16 to the cam shaft 50 as previously described.

As will be made clear subsequently, continued rotation of the shaft 16 and of the rotor 80 as urged by the flywheel 140, and the engine 32 as well as by the engines of the second bank, liquid of the cavity 22 will be caused to enter, be withdrawn from, and to enter the cylinder 34 in such a manner that the piston 42 sequentially effects an upward exhaust stroke, a downward intake stroke, and a compression stroke that forces the piston 42 to rise to the initial point at which the spark plug 72 was fired. It will be manifest to those of modest familiarity with the operation of a four-stroke internal combustion engine that the valves 64 and 66 are synchronized with rotation of the shaft 16 in such a manner that the exhaust valve 66 is closed shortly after the piston 42 is forced to the upper end of its travel path with the intake valve 64 being thereafter opened and remaining open during downward piston 42 movement and preferably until upward movement has commenced. Both valves 64 and 66 remained closed during the upward piston 42 movement constituting the compression stroke.

The intake valve 64 communicates by conventional means not shown with a source of air which may be pressurized (supercharged) if desired and conventional carburetion means may be provided to introduce and mix a fuel such as gasoline with the air admitted to the engine 30 by the intake valve 64.

Such carburetion can be in addition to the periodic spraying of fuel by the nozzle 70, or as an alternative to the latter.

The provision of means (150, 152 and 154) for releasing excess liquid and curtailing forced upward piston 42 movement has been described. Such means also tends to serve the additional function of bleeding or allowing escape of any air or vapor that may in any manner enter the cavity 22.

Means are provided to make up for any liquid losses from the cavity 22 and to displace any volume of air or vapor bled from the cavity 22. Such means comprises a check valve 156 that communicates with the cavity 22 as shown clearly in FIG. 1. Means, not shown, supplies liquid fluid (from the reservoir into which the tube 154 discharges) to the check valve 156 under a modest metered line 158 with a constant pressure output pump, not shown, being provided to assist gravity flow if necessary. Means 157 corresponding to items 156 and 158 is provided in symmetrical relationship to the latter.

The upper and lower engines 60 and 62 of the bank 14 that correspond to the engines 30 and 32 of bank 12 interconnected so that the engines 30 and 60 are 90° out of phase with each other as is also true of the engines 32 and 62. Engine 62 can either lead or lag engine 30 by 90°, but will be described as leading by 90°. It will be noted that in either case the rotors 80 and 142 are 180° apart in their angular orientation is quite evident on noting the relative positions the rotor 80 shown in full lines and rotor 142 shown in dashed lines in FIG. 1. The engine 62 can either lag or lead the engine 60 by 90°, but is hereinafter described as lagging.

It should be noted at this point that the rotors 80 and 142 seat against the opposite sides of the wall 118 in such a manner as to valve the passageways 130 and 132. Thus, for example, when the entire cross section of the passageway 130 is in registry with either the rotor 80 or the rotor 142, liquid flow through the walll 118 through the passageway 130 is precluded.

As will become manifest, the valving the passageways 130 and 132 by the rotors 80 and 142 is equivalent insofar as bank 12 is concerned to the passageways 130 and 132 having a direct passageway connection to each other. Indeed, if only one bank is to be employed, a direct passageway connection between the passageways 130 and 132 must be provided.

The function of the valved passageways 130 and 132 in the illustrated two-bank construction is much preferred to the single bank arrangement in that liquid movement is relatively more limited in that a short axial liquid movement rather than a substantially greater movement in a plane normal to the axis as would be the case in direct flow between the passageways 130 and 132.

An appreciation of all liquid movements in the cavity 22 can be obtained on consideration of the flow relative to the orbiting chambers 116, 118 and 120 during one rotation of the rotor 80. For reasons of symmetry a description of the fluid flow relative to the chamber 118 will suffice also for the chambers 116 and 120.

As a starting point, assume that the rotor 80 has rotated clockwise from its illustrated position in FIG. 1 to a position such that the cusp 86 has just cleared the passageway 122. Such clearance occurs when the cusp 86 is pointed essentially straight up as viewed in the drawings due to angular offset of the engine 30 and the illustrated inclination of the tapered passageway 122.

Such initial starting point for the rotor 80 and the chamber 118 corresponds to the piston 42 being adjacent the uppermost extent of its travel and commencing its downward power stroke movement forcefully expelling liquid from the cylinder 34 and the passageway 122 into the chamber 118. Clockwise motion of the rotor 80 from the described initial or starting point is accompanied by the chamber 118 increasing in volume with the consequence that the rotor 80 is hydraulically forced to rotate in a clockwise direction by the downward power stroke of the piston 42.

During such forced rotation of the rotor 80 by the power stroke of the piston 42, the chamber 118 has no communication with either of the passageways 130 and 132. However, the volumes of both the chambers 116 and 120 are diminishing so that liquid is forced into passageway 124 from the chambers 116 and 120. While in actuality, liquid expelled from the chamber 120 moves into the cavity of engine 60 while an equal quantity of liquid is expelled from the last mentioned cavity by rotor 142 into the chamber 116, it is convenient for purposes of description to resort to the equivalent fiction that the flow is directly from chamber 120 to the chamber 116 while the rotor 80 uncovers both of the passageways 130 and 132. Resort to such equivalent flow, though fictional, will hereinafter be made to facilitate a more ready understanding.

When the cusp 82 reaches the passageway 124 of engine 32, the rotor 80 closes communication of chamber 120 with the passageway 130, and thereafter the chambers 116 and 120 communicate with each other via the passageway 124 about the cusp 82 until the cusp 82 has traversed the latter passageway. At the time that the cusp 82 completes its traverse of the passageway 124, the rotor 80 commences to open the passageway 130, so effective communication is established between the chamber 118 and 116.

The engines 30 and 32 respectively execute their firing and compression strokes during the rotation of the rotor 80 thus for described.

The spark plug of engine 32 now fires and its ensuing power stroke hydraulically forces continued rotation of the rotor 80 in essentially the manner as effected by engine 30. Chambers 116 and 118 are both diminishing in volume and are effectively in communication with each other by the fictional equivalence described earlier, and consequently liquid is forced into the cylinder 34 via the passageway 122 forcing the piston 42 upwardly so that the engine 30 effects its exhaust stroke.

Upon cusp 84 reaching the passageway 122, the chambers 116 and 118 communicate via the passageway 122 about the cusp 84. Upon the cusp 84 completing its traverse of the passageway 122, the intake phase of engine 30 commences and the exhaust phase of engine 32 commences with the chambers 118 and 120 being in effective communication while diminishing in volume so as to force liquid into the passageway 124.

The intake and exhaust phases of engines 30 and 32 are concluded on the cusp 86 having completed its traverse of the passageway 124. This corresponds to shaft 16 having rotated to 540° as shown in following TABLE I.

TABLE I

| SHAFT 16 ROTATION | ROTOR 80 ROTATION | ROTOR 142 ROTATION | ENGINE 30 | ENGINE 32 | ENGINE 60 | ENGINE 62 |
|---|---|---|---|---|---|---|
| 0°–180° | 0°–60° | 180°–240° | Firing | Compression | Exhaust | Intake |
| 180°–360° | 60°–120° | 240°–300° | Exhaust | Firing | Intake | Compression |

TABLE I-continued

| SHAFT 16 ROTATION | ROTOR 80 ROTATION | ROTOR 142 ROTATION | ENGINE 30 | ENGINE 32 | ENGINE 60 | ENGINE 62 |
|---|---|---|---|---|---|---|
| 360°–540° | 120°–180° | 300°–360° | Intake | Exhaust | Compression | Firing |
| 540°–720° | 180°–240° | 360°–420° | Compression | Intake | Firing | Exhaust |
| 720°–900° | 240°–300° | 420°–480° | Firing | Compression | Exhaust | Intake |
| 900°–1080° | 300°–360° | 480°–540° | Exhaust | Firing | Intake | Compression |
| 1080°–1260° | 360°–420° | 540°–600° | Intake | Exhaust | Compression | Firing |
| 1260°–1440° | 420°–480° | 600°–660° | Compression | Intake | Firing | Exhaust |
| 1440°–1620° | 480°–540° | 660°–720° | Firing | Compression | Exhaust | Intake |
| 1620°–1800° | 540°–600° | 720°–780° | Exhaust | Firing | Intake | Compression |
| 1800°–1980° | 600°–660° | 780°–840° | Intake | Exhaust | Compression | Firing |
| 1980°–2160° | 660°–720° | 840°–900° | Compression | Intake | Firing | Exhaust |

The engines 30 and 32 thereupon initiate their compression and intake strokes and such strokes are concluded upon the cusp 82 completing its traverse of the passageway 122. The shaft 16 now having rotated to 720° as listed in TABLE I. The compression stroke of engine 30 is forced by liquid expelled from the chambers 116 and 120 into the passageway 122, it being noted that the chambers 116 and 120 are in fluid communication with each other by the effective connection between the passageways 130 and 132 due to their communication with the trochoidal cavity of bank 14.

Upon the cusp 82 having completed its transit of passageway 122, the engines 30 and 32 respectively commence their firing and compression strokes which are concluded upon the cusp 84 completing its transit of the passageway 124. The firing stroke of engine 30 hydraulically forces rotation of the rotor 80 and the latter expels liquid from the chambers 116 and 118 to force hydraulically the compression stroke of the engine 32.

Upon the cusp 84 completing its transit of passageway 124, the power stroke of engine 32 is effected as is the exhaust stroke of engine 30, with such strokes being concluded upon the cusp 86 completing its transit of passageway 122. At this point corresponding to axis 16 having rotated to the rotor 80 will have completed one full rotation and the shaft 16 having rotated 1080° or three revolutions.

While two full rotations of the rotor 80 must be completed to complete a single full cycle of operation of the assembly. The second full rotation of rotor 80 to complete a full cycle will be readily apparent, especially on reference to TABLE I and on recognizing that sequence is just as that described above with the roles of the engines 30 and 32 being interchanged.

While the firing order shown in TABLE I is preferred, with engines 30, 32, 62 and 60 firing in sequence, it will be manifest that other firing orders can be employed, it only being necessary that engine 32 either lead or lag engine 30 by 90° and that engine 60 either lead or lag engine 30 by 90°. For example, though definitely not preferred, engines 30 and 62 can operate in phase with each other with engines 32 and 60 both leading or both lagging engine 30 by 90°. It is also quite possible that engines 30 and 62 can be operated in phase with each other, with engines 32 and 60 respectively leading and lagging engine 30 by 90°.

The preferred firing order such as shown in TABLE I separates power strokes uniformly as to rotation of the output shaft 16 for smooth operation.

While such is not essential, especially at low elevations, some degree of supercharging is generally beneficial, particularly at considerable elevations above sea level or during high operating speed so as to facilitate or assist piston movements during intake strokes.

While the means 156 and 158 are such as to maintain an essentially void free liquid within the trochoidal cavities of both banks 12 and 14, a corresponding provision of means is symmetrically disposed at the left of the housing 20 as indicated at 157 in FIG. 1. The rear bank 14 can be similarly equipped if necessary or expedient. It will be understood that it is preferred that each of the engines 30, 32, 60 and 62 be provided with excess liquid or foam relief means 152 and 154 such as previously described in connection with engine 30.

Figure 4:
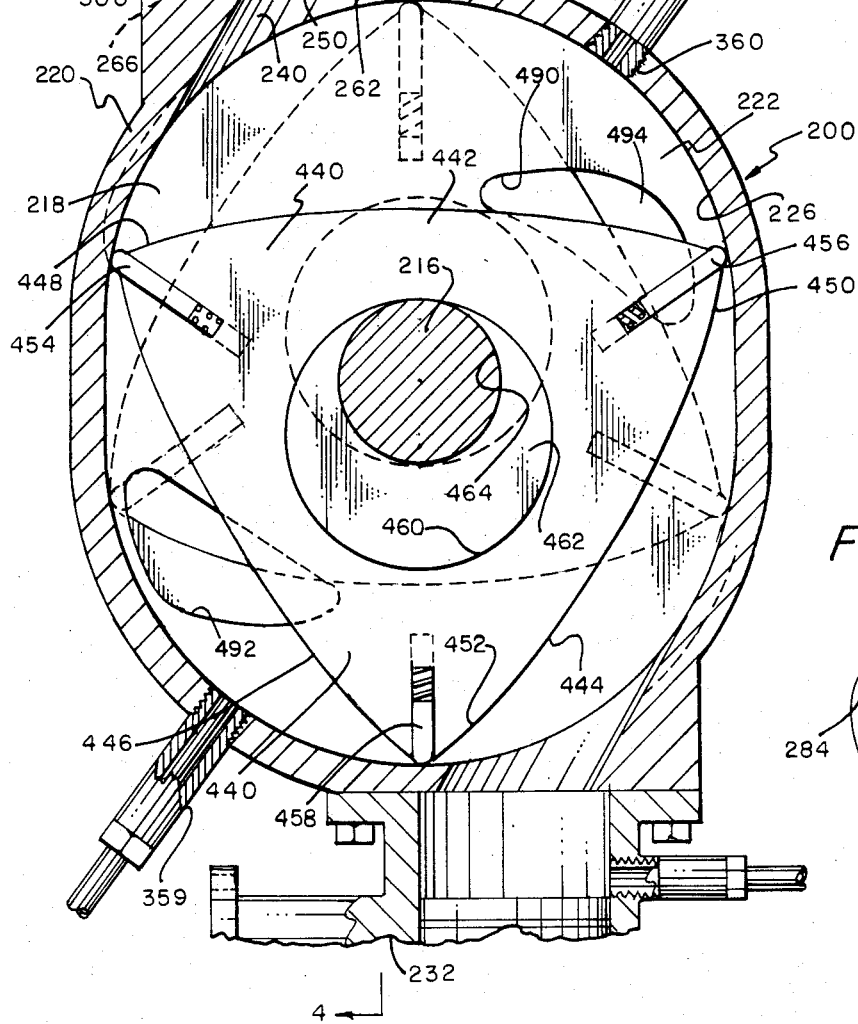
FIG. 4 is a reduced fragmentary longitudinal sectional view of the power assembly shown in FIG. 3, the view being taken on the plane of the section line 4—4 in FIG. 3.

Passing now to the form of the invention shown in FIGS. 3 and 4, it will be immediately apparent that the same involves many similarities to the form of the invention shown in FIGS. 1 and 2, and differs therefrom primarily in that the same involves reciprocating internal combustion engines that operate on a two-stroke cycle basis rather than the four-stroke basis of the invention depicted in FIGS. 1 and 2. As in the case of the form of the invention shown in FIGS. 1 and 2, the form of the invention in FIGS. 3 and 4 also utilizes a pair of 2-3 trochoidal cavity and rotor cusp combinations, wherein rotor controlled fluid communication between the cavities is provided.

In FIGS. 3 and 4, the reference numeral 200 designates generally a two-bank power assembly comprised of a first power assembly bank 212 and a second power assembly bank 214.

The banks 212 and 214 are identical except for being arranged to be 180° out of phase with respect to each other about their common axis defined by an integral rotary shaft 216 common to the banks 212 and 214. The banks 212 and 214 are separated axially by a wall 218.

Inasmuch as the banks 212 and 214 are identical except as specifically pointed out, a detailed description of the bank 212 will suffice for both. The bank 212 comprises a housing 220 having a two-lobed trochoidal cavity 222 therein bounded axially by an outer wall 224 and the separating wall 218. The circumferential periphery of the cavity 222 is defined by a trochoidal wall 226 that is preferably of cylindrical shape, geometrically speaking.

Two-stroke internal combustion engines 230 and 232 are fixed at diametrically opposed positions to the housing 220, such engines 230 and 232 serving to power the first power assembly bank 212. The engines 230 and 232 are identical to each other and in their connections to the housing 220 in the sense of having the axis of the shaft 216 as a line of symmetry. Accordingly, a detailed description of the engine 230 will suffice for both of the engines 230 and 232.

The engine 230 comprises a cylinder 234 with a head 236. For a purpose to be presently explained, the cylinder 234 is mounted on a hollow cyllinder 238 of lesser internal diameter than the cylinder 234, as clearly shown. The cylinder 238 is fixed to the housing 220 as shown in a manner similar to the previously described mounting of the cylinder 34 on the housing 20, with a tapered opening 240 in the housing 220 being provided similar to the opening 122 previously described.

The cylinder 238 has an internal partition wall 242 at its upper end having a central opening 244 therethrough. A piston rod 250 slidingly and sealingly extends through the opening 244, with the upper and lower ends of the piston rod 250 being fixed to pistons 252 and 254, respectively.

A coiled compression spring 256 is disposed about the rod 250 above the wall 242 and has its lower end seated against the latter and has its upper end seated against the piston 252 at a position spaced above the lower extremity of the skirt 258 of the piston 252 as shown at 260. In a similar manner, a coiled compression spring 262 surrounds the rod 250 below the wall 242 and has its upper and lower ends respectively seated against the underside of the wall 242 and the piston 254 (at a position above the upper edge of the skirt 264 of the piston 254 as shown at 266).

Figure 5:
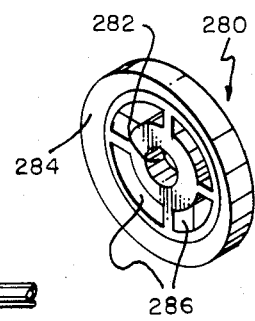
FIG. 5 is an enlarged isometric view of a fixed valve plate in the assembly shown in FIG. 3.
Figure 8:
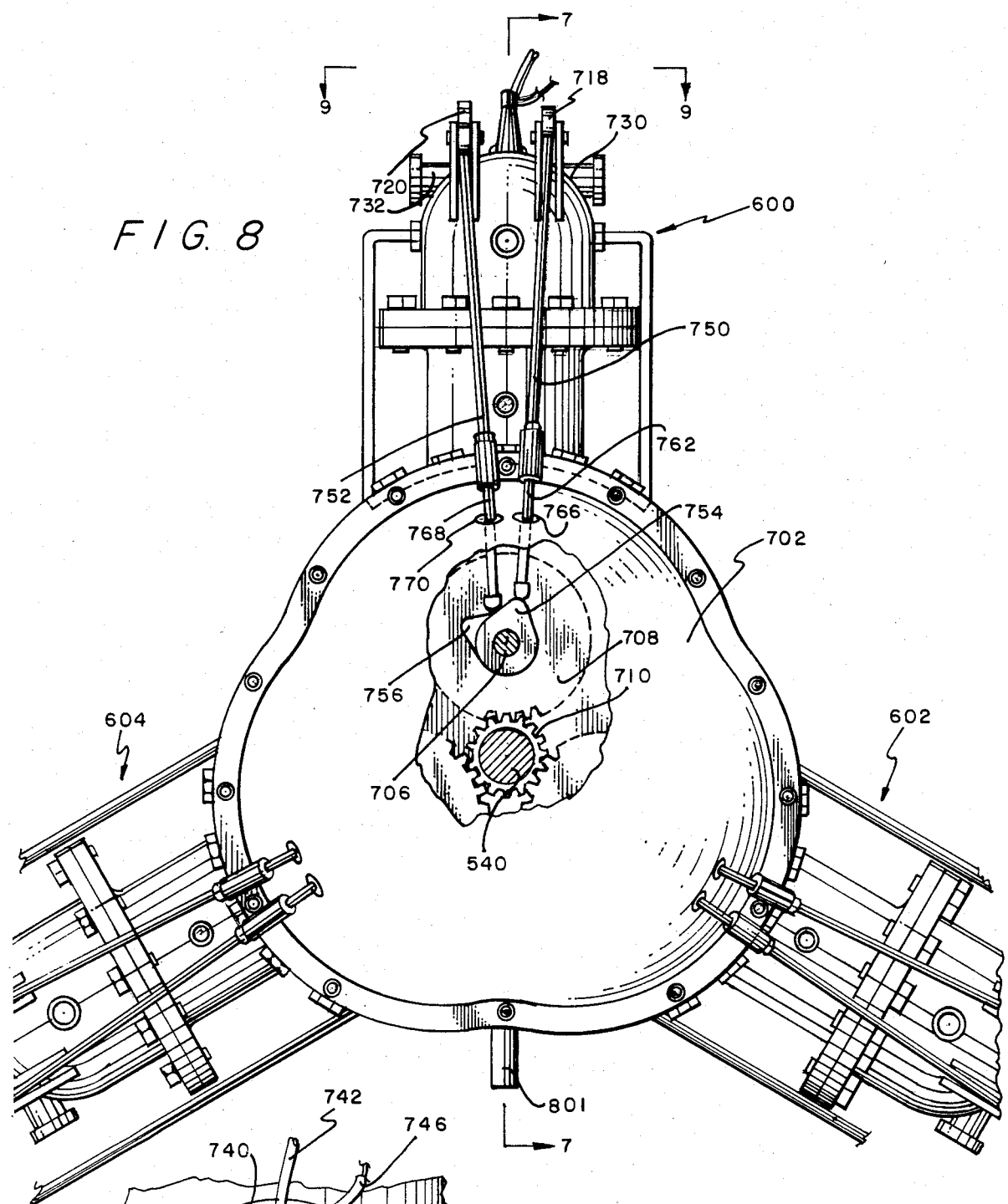
FIG. 8 is a fragmentary front view of the assembly shown in FIGS. 6 and 7, with a portion of the central housing being broken away to reveal the push rod driving mechanism.
Figure 9:
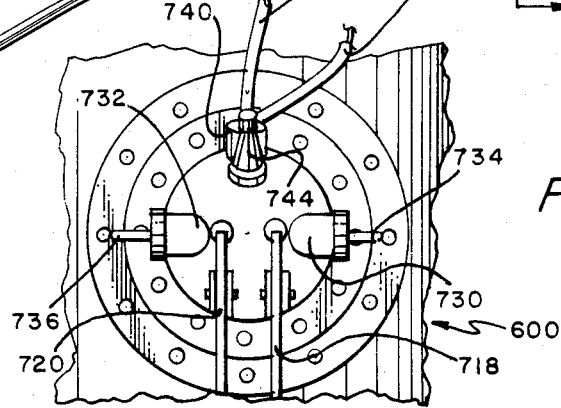
FIG. 9 is a fragmentary top plan view taken from the plane of the line 9—9 in FIG. 8.

The lower cylinder 238 is provided with an integral fuel-air mixture inlet pipe 270 that opens into the interior of cylinder at 272 at a height just above the skirt 264 of the piston 254 when the latter is at the position near the lowermost extent of its downward travel as shown in FIG. 3. The free end of the pipe 270 is flanged as shown at 274 and otherwise adapted for connection to a conventional valve controlled carburator, now shown, that supplies a fuel-air mixture to the pipe 270. The fuel-air mixture supplied may be supercharged if desired. A combined valve guide and valve seat 280 best shown in FIG. 5 is fixed in the pipe 270. The guide and seat 280 has a central guide opening 282 and an annular tapered valve seat 284. Openings 286 are provided between the seat 284 and the guide opening 282. A valve element and stem combination 288 is normally seated against the seat 284 and is yieldingly retained in such closing position by a coiled compression spring 290 that embraces the valve stem and which is seated between the guide 280 and an enlarged end 292 of the valve stem. The valve construction 280–290 serves as a normally closed check valve that will open when the pressure in the inlet end of the pipe 270 exceeds the pressure at the discharge end 272 by a predetermined amount.

Check valve means 296, which can be generally similar to the valve means 280–290, is provided to control fluid flow through an opening 298 through the partition 242. The valve means 296 is normally closed and only opens to afford communication through the partition wall 242 when the pressure immediately therebelow exceeds the pressure immediately thereabove by a predetermined amount.

The cylinder 238 is provided with an excess liquid relief port 300 that is controlled by a check valve means 302. The port 300 is cleared by the piston 254 only when the piston 254 is close to the upper end of its travel path. The purpose of the port 300 and its valve 302 is to relieve hydraulic pressure acting against the underside of piston 254 during upward movement of the latter to prevent the piston from forcefully engaging the wall 242. The valve 302 prevents reverse flow entering the cylinder 238.

To afford two-stroke engine operation, the wall of the cylinder 234 is provided with an internal passageway 310 that opens at its opposite ends to the interior of the cylinder at positions 312 and 314 that are respectively immediately above the wall 242 and at about the midpoint of the length of the cylinder 234. The cylinder 234 is provided an exhaust port 316 that is connected to an exhaust pipe 318. The port 316 is at about the height of the passageway position 314 and diametrically opposed thereto so as to optimize the purging of combustion products. The port 316 and the position 314 of the passageway are cleared by the piston 252 only when the latter is at and near the lowermost end of its travel.

A cycle of operation of the engine 230 will be readily understood. Assume as a starting point that the piston 252 is near the upper end of its travel with a fuel-air mixture charge comprised between the piston 252 and the dome or head 236 of the cylinder. Also assume space between the piston 252 and the partition wall 242 to be filled with a fuel-air mixture. Conventional means, not shown, driven by the shaft 216 causes a spark plug 320 to fire thereby igniting combustion of the fuel-air charge above the piston 252. Pressure resulting from such combustion forces the pistons 252 and 254 downward compressing the fuel-air mixture between the wall 242 and the piston 252 while also greatly reducing the pressure of and increasing the volume of the space between the wall 242 and the piston 254. While the piston 252 nears the end of its downward stroke, the exhaust port 316 opens by clearance of the piston 252 so that exhaust commences concurrently with the now compressed fuel-air mixture immediately below the piston 252 passing through the passageway 310 to enter the cylinder 234 above the piston 252 to both recharge the cylinder 234 for the next firing stroke and to aid in scavenging spent combustion products.

As the passageway 310 vents a fresh fuel charge from below to the top of the piston 252, the piston 254 clears the discharge end 272 of the pipe 270 thereby resulting in fuel-air mixture to pass into the nearly evacuated space below the piston 254.

After the pistons 252 and 254 reach the lowermost end of their travel they are forced to their upper starting positions by hydraulic pressure acting on the underside of the piston 254 as will be explained.

As the piston 252 and 254 move upwardly, the newly admitted fuel-air mixture in the space between the piston 254 and the wall 242 is compressed and forced into the space between the piston 252 and the wall 242 when the pressure differential becomes sufficient, and the arrangement is such that this will occur about the time that the piston 252 closes the upper end of the passageway 310.

The transfer of fuel-air mixture from immediately below to immediately above the wall 242 continues as the fuel-air charge above the piston 252 is compressed.

Additional air or fuel-air mixture can be introduced into the space between the piston 252 and the wall 242 when the piston 252 is at or nears the end of its upward movement to achieve an additional supercharging effect if deemed necessary or expedient. Such introduction is from a pressurized source of air or air-fuel-air mixture, not shown, that is connected by a pipe 350 to a port 352 that is cleared by the piston 252 only as the latter is at or near the upper limit of its travel. The rate of pressurized air or fuel-air mixture introduction into the space below the piston can be controlled by a valve 354 in the pipe 350. The valve 354 can be manually controlled or automatically controlled by any suitable means, not shown, response to power output demand for example.

As the piston 252 reaches or closely approaches the desired upper limit of its travel, the lower piston clears the port 300 so that any hydraulic pressure still urging upward movement of the piston 254 is relieved and any excess quantity of liquid in the trochoidal cavity 222 in to afford rotor valved communication between the trochoidal cavities 222 and 494 of the two power banks 212 and 214.

The operation of the two-stroke form of the invention shown in FIGS. 3-5 will be readily understood in the light of operation of the four-stroke system of FIGS. 1 and 2, and on reference to the following TABLE II.

TABLE II

| SHAFT 216 Rotation | ROTOR 440 of Bank 212 | ROTOR of Bank 214 | ENGINE 230 | ENGINE 232 | ENGINE 484 | ENGINE 486 |
|---|---|---|---|---|---|---|
| 0-180 | 0-60 | 180-240 | Firing & Exhaust | Intake & Compression | Intake & Compression | Firing & Exhaust |
| 180-360 | 60-120 | 240-300 | Intake & Comp. | Firing & Exh. | Firing & Exh. | Intake & Comp. |
| 360-540 | 120-180 | 300-360 | Firing & Exh. | Intake & Comp. | Intake & Comp. | Firing & Exh. |
| 540-720 | 180-240 | 360-420 | Int. & Comp. | Firing & Exh. | Firing & Exh. | Int. & Comp. |
| 720-900 | 240-300 | 420-480 | Firing & Exh. | Int. & Comp. | Int. & Comp. | Firing & Exh. |
| 900-1080 | 300-360 | 480-540 | Int. & Comp. | Firing & Comp. | Firing & Exh. | Int. & Comp. | communication with the piston 254 is released to a reservoir or supply vessel, not shown, for such liquid, such reservoir constituting a source from which liquid is forced by means not shown to a make-up pipe or tube 356 at a constant modest pressure.

The make-up pipe 356 is connected via a check valve 358 to a port 360 communicating with the cavity 222 as clearly shown in FIG. 3. The check valve 358 prevents discharge of liquid from the cavity 222 to the pipe 356, but readily admits of reverse flow. The arrangement is such that the cavity 222 is continuously liquid filled adjacent the port 360.

As in the case of the previously described embodiment of the invention, the shaft 216 is operatively associated with a rotor 440 having three sides 442, 444 and 446 that merge to define three cusps 448, 450 and 452 that are respectively provided with seal assemblies 454, 456 and 458 that are in continuous sliding and seating engagement with the inner surface of the trochoidal wall 226.

The rotor 440 has a central opening 460 in which an eccentric 462 is rotatable. The eccentric 462 has an off-center opening 464 therethrough which can be tangential to the outer surface of the eccentric 462 as shown if desired. Needless to say, the opening 464 can be spaced from the surface of the eccentric 462.

The shaft 216 is rotatably received through the opening 464 of the eccentric 462.

Conventional means including gearing, not shown, but which may be identical to that indicated at 100 and 102 in FIG. 2 are provided to index the relative positions of the shaft 216 and the foror 440 and to maintain a rotation ratio of such elements at three to one with the sealing means 454, 456 and 458 being in continuous sliding and sealing engagement with the trochoidal wall 226.

The two-stroke engine embodiment of FIGS. 3-5 include the shaft 216 being provided a flywheel 480 and a accessory drive gear 482 by means of which conventional means, not shown, can be driven to effect appropriately timed firing of the spark plug 320 of the engines 230 and 232 of the power bank 212 as well as the engines 484 and 486 of the power bank 214.

In a fashion analogous to and for the same purpose as the passageways 130 and 132 of the previously described embodiment of the invention, corresponding passageways 490 and 492 extend through the wall 218

As a starting point, it is assumed that the cusp sealing means 454 has just completed its traverse of the passageway 240 during clockwise rotation of the rotor 440, at which time the piston 252 will be at or about at the uppermost extent of its travel and the plug 320 has fired to initiate the power stroke.

Inspection of TABLE II will make it evident that a full rotation of rotor 440 completely describes a cycle of the apparatus of FIGS. 3-5, and does not require two complete rotations of the rotor as necessary in the case of the four-stroke embodiment of FIGS. 1 and 2.

It will be evident in the operation of the embodiment of FIGS. 3-5 that the passageways 490 and 492 serve in the same manner as the passageways 130 and 132 of the first described embodiment in effecting the equivalent of fluid transfer within the respective trochoidal cavities on valving of the passageways 490 and 492 by the rotors of the embodiment of FIGS. 3-5 in the same manner as previously described in connection of the first described embodiment.

Attention is now directed to the form of the invention shown in FIGS. 6-12 and which is designated generally at 500. In contrast to previously described embodiments which involve 2:3 trochoidal structures dedicated to hydraulic functions (rather than their customary function in the renowned Wankel engine), the apparatus 500 entails a 3:4 trochoidal structure dedicated to coact hydraulically with a plurality of (three) reciprocating piston engines radially spaced about and extending from 3:4 trochoidal structure.

The power assembly 500 comprises a housing 502 that includes sections 504 and 506 secured together by bolts such as indicated at 508. The housing 502 is hollow and as best shown in FIGS. 10 and 11 has an inner wall surface 510 that defines a triple-lobed trochoidal cavity 512. A four-sided rotor 514 is rotatable in the cavity 512 and has four cusps or apices provided with seals 516, 518, 520 and 522 that slidingly seal against the wall surface 510. The arrangement is such that the four chambers 524, 526, 528 and 530 are defined that are bounded respectively by rotor sides 532, 534, 536 and 538. During rotation of the rotor, the chambers 524-530 orbit the axis of the housing 502.

A central drive shaft 540 is journaled through the housing 502 and a cylindrical eccentric 542 is fixed to the shaft 540 to rotate therewith. The rotor 514 has a central opening 546 that rotatably receives the eccentric 542. The rotor 514 is formed at one side with an internal ring gear 548 that is coaxial with the opening 546.

As clearly shown in FIG. 7, the gear 548 meshes with a smaller gear 550 that is secured against rotation by means that includes a flanged sleeve 552 integral with the gear 550. The sleeve 552 rotatably receives the shaft 540 therethrough, with the flange 554 thereof being releasably fixed to the housing section 506 by any suitable means, not shown.

As clearly shown in FIG. 7, the opposite sides of the rotor 514 are provided with recessed ring seals 566 and 568 that slidingly and sealingly engage the adjacent faces 570 and 572 of the housing sections 506 and 508.

The arrangement is such that the rotor 514 rotates one complete revolution for four rotations of the shaft 540, with the cusps 516–522 being held in sealing engagement with the wall 510.

Three single cylinder engines 600, 602 and 604 are mounted to extend radially from the housing 502 from positions angularly coincident with the lobes of the cavity 512 as clearly shown in FIGS. 6 and 10.

Inasmuch as the engines 600, 602 and 604, which are 120° apart are identical, a detailed description of the engine 600 should suffice for all.

The engine 600 includes an inner cylinder portion 610 that has lower and upper flanges 612 and 614 that are respectively bolted to the housing 502 and the flanged lower end of an outer or upper cylinder portion 616. As clearly shown in FIG. 7, such bolted connections of the inner cylinder 610 are each provided in a conventional manner with sealing gaskets 618 and 620.

The inner cylinder portion 610 is hollow and has a cylindrical inner surface 622. The upper end of the hollow interior is closed by an integral wall 624 which has a central opening for slidingly accommodating vertical reciprocation of a piston rod 626 therethrough.

The upper cylinder portion 616 is also hollow and includes an inner cylindrical surface 628, and is closed at its outer extremity by an integral dome-shaped structure 630. It is to be noted that the circular cylindrical surface 628 corresponds to a substantially greater diameter than that of the circular cylindrical surface 622.

The upper and lower ends of the piston rod 626 are respectively connected to pistons 632 and 634 that respectively slidingly and sealingly engage the surfaces 628 and 622.

The wall 624 is provided with openings 636 that afford free fluid communication between the cylindrical spaces within the surfaces 622 and 628.

The piston 632 has downwardly extending skirt 638 and a coiled compression spring 640 embraces the rod 626 and is biased between the wall 624 and a portion of the piston 632 within the skirt 638. In a similar fashion the piston has an upwardly extending skirt 642 and coiled compression spring 644 has its opposite ends biased against the wall 624 and the piston 634 within the skirt 642.

The engine 600 is provided with means to maintain the cavity 512 liquid filled that is analogous to those described previously in connection with the other embodiments, and such means comprises a supply line 650 connected to a low pressure metered liquid source that feeds liquid to the cavity 512 by way of a check valve 652 and a passageway 654.

Means are provided to vent excess liquid and to avoid urging the piston 634 forcefully against the wall 624. Such means comprises an outlet port 656 that is connected to a discharge line 658 via a loaded check valve 660. The line 658 can deliver liquid to a reservoir, not shown, that can serve as a source of supply for the make up line 650.

It will be noted that the port 656 is just cleared by the piston 634 when the latter is at its uppermost travel position shown in FIG. 7.

The port 656 is vented to space above the wall 624 by a bore 662. Another related vent is provided by a bore 664 that opens laterally as shown into the cylinder 622 at a position at the same height of and which is diameterically opposed to the port 656.

Means is provided to ventilate the cylinder 628 below the piston 632 when the latter is near and at the upper end of its stroke stroke, and such means is in the form of a breather pipe 672 connected as clearly shown in FIG. 7. The free end of the breather case is provided with a filter cap 674 to prevent the ingress of foreign matter into the engine 600. The lower engines 602 and 604 are provided with upstanding vent means corresponding to 672 and 674 of engine 600. The vent pipes of engines 602 and 604 can be conveniently coupled to the pipe 672 to share the filter 674 in common if deemed expedient or necessary.

The upper engine section 616 is provided with liquid coolant passageways such as those shown at 676 and 678 so that the engine can be cooled against overheating. It will be evident to those skilled in the art that a coolant liquid can be circulated through the passageways 676 and 678 and to and from a radiator, not shown, in a conventional manner through connections such as that shown at 680.

The shaft 540 is provided with a flywheel 700 at one end and the other end of the shaft 540 sealingly projects through a dome-like housing section 702 that is peripherally secured to the housing section 504 by bolts 704 as clearly shown in FIG. 7. An axle 706 is disposed between the housing sections 504 and 702 and has its opposite ends journaled in such sections as shown. A gear 708 is fixed to the axle 706 so as to be driven by a gear 710 fixed to the shaft 540, whereby cams 754 and 756 are driven for actuating intake and exhaust valves 714 and 716 of the engine 600 as to be presently explained.

In essentially the customary manner, the valves 714 and 716 are actuated by rockers 718 and 720 in an arrangement such that the valves 714 and 716 (which are conventionally spring biased toward their closed positions) are opened when the rockers 718 and 720 bear thereagainst.

The valves 714 and 716 respectively control fluid communication to connectors 730 and 732.

As in the previously described embodiments, the intake line 730 is connected to a source of filtered air, not shown, and such air source can be, if desired or deemed expedient, pressurized to obtain supercharging. Also, the air source can be carbureted with a suitable fuel, such as gasoline, in a conventional manner, not shown.

In lieu of or supplementary to fuel supplied by line 730, the engine 600 is optionally provided with a fuel inlet jet 740 supplied at times synchronized with the rotation of shaft 540 with pressurized pulses of liquid fuel through line 742. Ignition at times also synchronized with shaft 540 rotation is obtained by means of a spark plug 744 fed by an ignition wire 746 connected to a conventional ignition system, not shown, that is operatively driven by the shaft 540.

The rockers 718 and 720 are respectively driven by angulated push rod assemblies 750 and 752 that bear against the cams 754 and 756 fixed to the axle 706. The assembly 750 includes upper and lower sections 760 and 762 that are releasably secured together by a coupling means 764. As clearly shown in FIG. 7, the lower section 762 slidingly extends into the dome-shaped housing portion 702 through a guide bearing 766. In a similar fashion, the lower section 768 of the push rod assembly 752 extends through a guide bearing 770 in the housing 702.

The cams 754 and 756 have surfaces which bear slidingly against and actuate the push rods 762 and 768.

As clearly shown in FIG. 12, the cusp seal 516 (which is representative of the other cusp seals 518, 520 and 522) comprises a wiper blade 780 radially and slidingly reciprocable in a slot 782 in the rotor 514, with spring means 784 being provided in the bottom of the slot 782 to urge the blade 780 radially outward. The blade 780 can be made of any suitable material such as block of graphite. The geometry is such that very little movement of the blade 780 occurs, and is essentially only such as to maintain a tight seal on wear of the blade 780.

The structure of the engines 602 and 604 and their relationship to rotation of the shaft 540 is identical to that of the engine 600 and detailed descriptions thereof could only serve to obfuscate the actual invention and such is therefore omitted.

Reference to accompanying TABLE III (following this paragraph) will make the operation of the 3:4 apparatus incorporating three four-stroke internal combustion engines shown in FIGS. 6-12 readily understood; especially so in the light of the previously described embodiments of the invention. For reference purposes, FIG. 10 shows both the shaft 540 and the rotor 514 in their 0° positions relative to engine 600.

communication between first and second variable volume chambers during a predetermination portion of a rotary motion cycle, and varying the volume of the first chamber as a function of the position of a linearly movable piston in a cylinder partially bounding such chamber, while concurrently varying the volume of the second chamber as the latter is caused to orbit a central axis as a function of the position of a rotor mounted for eccentrically orbiting the central axis within a cavity bounded by a trochoidal wall, with the second chamber being bounded by the rotor and the trochoidal with which it is in sliding engagement, and with the rotor being mechanically coupled to rotary shaft coincident with the central axis.

2. The method of claim 1, wherein the liquid fluid communication established and maintained between the first and second chambers during a portion of a rotary motion cycle is sufficiently unrestricted so that approximately equal pressures hydraulically act against both the piston and the rotor during said portion of a rotary motion cycle.

3. The method of claim 2, wherein a reciprocating linear motion is imparted to the piston by operating a reciprocating-type internal combustion engine with a reciprocating part of the latter being caused to move in unison with the piston, whereby the reciprocating-type internal combustion engine has its output motion converted to the rotary motion of the rotary shaft.

4. A method for converting the reciprocating piston motion of an internal combustion engine to rotation of an output shaft, said method involving the provision of a cavity bounded by a trochoidal wall with an eccentrically mounted rotor disposed in such cavity and slidingly engaged with the wall to define a chamber therebetween that varies in volume on movement of the rotor, the steps of varying the volume of the chamber

TABLE III

| ENGINE 600 | | | ENGINE 602 | | | ENGINE 604 | | |
|---|---|---|---|---|---|---|---|---|
| SHAFT | PHASE | ROTOR | SHAFT | PHASE | ROTOR | SHAFT | PHASE | ROTOR |
| 0-180 | Intake | 0-45 | 300-120 | Compression | 345-30 | 60-240 | Exhaust | 15-60 |
| 180-0 | Compression | 45-90 | 120-300 | Fire | 30-75 | 240-60 | Intake | 60-105 |
| 0-180 | Fire | 90-135 | 300-120 | Exhaust | 75-120 | 60-240 | Compression | 105-150 |
| 180-0 | Exhaust | 135-180 | 120-300 | Intake | 120-165 | 240-60 | Fire | 150-195 |
| 0-180 | Intake | 180-225 | 300-120 | Compression | 165-210 | 60-240 | Exhaust | 195-240 |
| 180-0 | Compression | 225-270 | 120-300 | Fire | 210-255 | 240-60 | Intake | 240-285 |
| 0-180 | Fire | 270-315 | 300-120 | Exhaust | 255-300 | 60-240 | Compression | 285-330 |
| 180-0 | Exhaust | 315-0 | 120-300 | Intake | 300-345 | 240-60 | Fire | 330-15 |

Note:
Firing Order: 602-600-604
Firing Period: 45° With Engine Firing Every 60°

It will be understood, of course, that the trochoidal cavity 512 about the rotor 514 is liquid filled including the spaces 800 radially inward of the engine pistons 634 and the contoured passageways 802 communicating between such spaces 800 and the trochoidal cavity 512.

While the apparatus illustrated in FIGS. 6-12 and its operation outlined in TABLE III has to do with four-stroke cycle engine operation, it is deemed well within the skill of the art to modify such apparatus and operation to conform to a two-stroke cycle engine mode; this being especially true in the light of the previously described four and two-stroke embodiments.

Having now fully described the invention, attention is now directed to the appended claims in order to ascertain the actual scope of the invention.

I claim:

1. In a method of converting a rotary motion to a linear reciprocating motion and vice versa, the steps comprising establishing and maintaining liquid fluid by hydraulically coupling the chamber to the reciprocating piston motion, and mechanically coupling the rotational and eccentric motion of the rotor to impart rotation to the output shaft.

5. The method of claim 4, and concurrently converting the reciprocating piston motion of a second internal combustion engine to rotation of the previously recited output shaft, said method involving the provision of a second cavity bounded by a second trochoidal wall with a second rotor disposed in said second cavity that slidingly engages the second wall to define a second chamber therebetween that varies in volume on movement of the second rotor, varying the volume of the second chamber by hydraulically soupling the second chamber to the reciprocating piston motion of the second engine, mechanically coupling motion of the second rotor to impart rotation to said rotatable output shaft, operating the two engines in a predetermined out of phase relationship, and establishing a transfer fluid communication between chambers of the two cavities during predetermined relative ranges of positions of the two rotors in an arrangement such that fluid is transferred alternately from one cavity to the other.

6. A motion transducer employing a liquid working fluid that operatively interconnects first and second elements respectively mounted for rotary motion and linear reciprocating motion, said transducer comprising a trochoidal wall bounding a cavity of such configuration and having a lobe, said first element being a rotary shaft operatively coupled to a rotor eccentrically mounted thereon and disposed in said cavity, said rotor sealingly engaging said wall to define chambers therebetween that orbit the shaft during rotation of the shaft, said transducer additionally comprising a cylinder, and said second element being a piston mounted for reciprocation in the cylinder and separating the interior of the cylinder into an outer chamber and a pumping chamber of variable volumes, aand means providing fluid-tight fluid communication through said wall between the interiors of said pumping chamber and the cavity at a position adjacent said lobe in an arrangement such that a liquid disposed in the cavity about the rotor and in the pumping chamber is contained and alternately moves between the cavity and the pumping chamber during respective rotation of the shaft and reciprocation rotation of the shaft and reciprocation of the piston.

7. The combination of claim 6 together with means for periodically forcing movement of the piston in a direction that displaces fluid from the pumping chamber into the cavity and thereby impart rotation to the shaft.

8. The combination of claim 7, wherein the shaft and parts fixed thereto have a sufficient moment of inertia for cyclically displacing fluid from the cavity to the pumping chamber and thereby cause movement of the piston toward the outer chamber.

9. The combination of claim 7, wherein the means for periodically forcing the piston to displace liquid from the pumping chamber comprises a two-stroke cycle internal combustion engine that includes as components thereof the previously recited cylinder and the previously recited piston with said outer chamber constituting the working chamber thereof wherein combustion and compression alternately occur.

10. The combination of claim 7, wherein the means for periodically forcing the piston to displace liquid from the pumping chamber comprises a four-stroke cycle internal combustion engine that includes as components thereof the previously recited cylinder and the previously recited piston with said outer chamber constituting the working chamber thereof wherein combustion and compression alternately occur.

11. The combination of claim 6, together with means for cyclically forcing displacement of liquid from the cavity into the pumping chamber.

12. The combination of claim 11, wherein the means for cyclically forcing liquid into the pumping chamber comprises, at least in part, the rotary shaft and parts rotatable therewith having a moment of inertia such as to impart a flywheel effect.

13. The combination of claim 11, together with means for periodically forcing the piston to displace liquid from the pumping chamber comprises a two-stroke cycle internal combustion engine that includes as components thereof the previously recited cylinder and piston with said outer chamber constituting the working chamber of such engine, wherein the means for cyclically forcing liquid into the pumping chamber comprises a second two-stroke internal combustion engine operatively coupled to the rotary shaft as the previously recited engine, with the engines operating out of phase with each other, whereby the combustion stroke of each engine aids the compression stroke of the other by reason of their respective operative liquid coupling to the rotary shaft.

14. The combination of claim 11, together with means for periodically forcing the piston to displace liquid from the pumping chamber comprises a two-stroke cycle internal combustion engine that includes as components thereof the previously recited cylinder and piston with said outer chamber constituting the working chamber of such engine, wherein the means for cyclically forcing liquid into the pumping chamber comprises a second four-stroke internal combustion engine operatively coupled to the rotary shaft as the previously recited engine, with the engines operating out of phase with each other, whereby the combustion stroke of each engine aids the compression stroke of the other by reason of their respective operative liquid coupling to the rotary shaft.

15. The combination of claim 13, wherein the recited structure constitutes a first power bank assembly, together with a corresponding second power bank assembly, said first and second power bank assemblies being arranged in tandum, with the rotary shafts of such assemblies being in alignment with and integrally joined to each other.

16. The combination of claim 14, wherein the recited structure constitutes a first power bank assembly, together with a corresponding second power bank assembly, said first and second power bank assemblies being arranged in tandum, with the rotary shafts of such assemblies being in alignment with and integrally joined to each other.

17. The combination of claim 15, wherein the first and second power bank assemblies are operatively 180° out of phase with each other, a wall structure separating the trochoidal cavities of the assemblies comprising passageways extending through said wall and interconnecting chambers of the cavities in an arrangement such that fluid flows in first one direction and then the other in each of the passageways.

18. The combination of claim 16, wherein the first and second power bank assemblies are operatively 180° out of phase with each other, a wall structure separating the trochoidal cavities of the assemblies, and means hydraulically coupling the rotors of the first and second assemblies comprising passageways extending through said wall and interconnecting chambers of the cavities, in an arrangement such that fluid flows in first one direction and then the other in each of the passageways.

* * * * *